United States Patent [19]
Karthaus et al.

[11] Patent Number: 5,214,924
[45] Date of Patent: Jun. 1, 1993

[54] METHOD AND APPARATUS FOR RECOVERING SOLVENTS

[75] Inventors: Michael Karthaus, Neuss; Klaus Hermanns, Hünxe; Peter Hermanns, Wesel, all of Fed. Rep. of Germany

[73] Assignees: Herco-Kuhltechnik Hermans & Co., GmbH; Air Products GmbH, Werk Hattingen, both of Fed. Rep. of Germany

[21] Appl. No.: 808,159

[22] Filed: Dec. 13, 1991

[30] Foreign Application Priority Data

Dec. 17, 1990 [DE] Fed. Rep. of Germany ....... 4040389

[51] Int. Cl.$^5$ .................................................. F25J 3/00
[52] U.S. Cl. ........................................... 62/11; 34/79; 62/40
[58] Field of Search .................... 62/8, 9, 51.1, 37, 40, 62/11; 34/79

[56] References Cited

U.S. PATENT DOCUMENTS

| | | | |
|---|---|---|---|
| 3,400,545 | 9/1968 | Hendal | 62/9 |
| 3,874,184 | 4/1975 | Harper et al. | 62/9 |
| 3,912,476 | 10/1975 | Mikawa et al. | 62/37 |
| 4,223,450 | 8/1980 | Rothchild | 34/16 |
| 5,084,081 | 1/1992 | Rohde . | |

FOREIGN PATENT DOCUMENTS

| | | |
|---|---|---|
| 0094172 | 11/1983 | European Pat. Off. . |
| 0417592 | 3/1990 | European Pat. Off. . |
| 3042082 | 5/1982 | Fed. Rep. of Germany . |
| 3907437 | 7/1989 | Fed. Rep. of Germany . |
| 3810705 | 10/1989 | Fed. Rep. of Germany . |

OTHER PUBLICATIONS

Abluftreinigung durch Losemittelruckgewinnug, Cav 1988, Sep., pp. 30, 32, 34, 39.
Technische Rundschau 23/87, Seiten 46-47, "Losemillelrecycling auf Inertgasbasis".

Primary Examiner—Ronald C. Capossela
Attorney, Agent, or Firm—Ratner & Prestia

[57] ABSTRACT

In a method and an apparatus for avoiding or reducing trouble-induced time delays in solvent recovery from production processes, apart from the solvent circuit and apart from the supplying of the locks with carrier gas, when necessary via at least one separate supply conduit a metered amount of pure carrier gas is supplied to the production plant and at the same time via at least one separate discharge conduit a substantially corresponding amount of mixture of carrier gas and solvent is withdrawn.

15 Claims, 2 Drawing Sheets

METHOD AND APPARATUS FOR RECOVERING SOLVENTS

BACKGROUND OF THE INVENTION

1. Field of the Invention

The invention relates to a method and an apparatus for avoiding or reducing trouble-induced time delays in solvent recovery from production processes.

2. Description of the Prior Art

In many industrial processes, for example coating and drying of tapes, foils, etc., such as audio or video tapes, solvent vapours arise which must be collected and recovered because they are mostly explosive when mixed with air and almost always harmful to health.

From DE-A-30 42 082 a method is known for recovering solvents in which the exit air containing solvent vapours, for example from such a drier, is conducted via adsorbent charges. The exit air purified by adsorption of the solvents is thereafter released into the atmosphere. A second circuit with inert gas serves for the desorption of the solvent-charged adsorbent charges.

DE-A-39 07 437 discloses a method for removing solvent constituents from the exit air of painting or enamelling plants and the like in which the exit air from such a painting plant is divided into two subflows. One subflow is returned directly to the plant after reheating whilst the other subflow is returned to the plant only after purifying.

For reliable operation of these plants, due to the use of air as flushing gas, particular attention must be paid to ensuring that the concentration of the solvent vapours in such a plant remains so low that the ignition or explosion limit of the mixture of air and solvent is not reached. As a result, large amounts of air must be conducted through the plant and after extraction from the plant freed from the entrained solvent vapours. Moreover, moisture is entrained with the air supplied into the plant and is frequently present in a greater amount than the actual solvent. This leads to difficulties in all exit air purifying methods of this type and additional apparatus and energy expenditure.

A further method of purifying a carrier gas by adsorption of the solvent vapours contained therein is known from DE-C-38 10 705. In this case as well the purified exit gas is released to the environment.

However, to enable the demands of high operational reliability and economical use of energy to be met, the driers, and frequently also the coaters, are encapsulated, shielded from the access of air and held under an inert atmosphere, for example nitrogen. At the same time, the locks are supplied with inert gas.

Corresponding plants are described in the technical journal "cav", number 1988/9, on pages 30, 32, 34 and 39, and in the technical journal "Technische Rundschau", number 23/87 on pages 46 and 47. In the method which was disclosed in the "Technische Rundschau" for "solvent recycling on inert gas basis" the mixture of solvent and inert gas extracted from the plant is led in a primary circuit via a socalled recovery with recuperator and cooler and the inert gas freed from the solvent constituents returned to the plant again. Via a further circuit, the socalled secondary circuit, the locks through which the plant is encapsulated from the ambient air are also supplied with purified inert gas.

A modern solvent recovery plant as apparent for example from elder European patent application 90 116 885.6 thus even has two circuits partially separate from each other, i.e.

a carrier gas circuit from which the solvent condenses and the purified carrier gas is returned to the production plant again, and a low-temperature section with which the locks of the manufacturing plant, for example a drier, are supplied.

In continuous production undesirable time delays occur whenever the operation of the drier must be interrupted, for example because of tearing of the tape, in order to open the plant to carry out repair measures. For safety technical reasons, this can only be done when the solvent content in the drier atmosphere has been reduced by the solvent recovery apparatus to such an extent that there is no longer any danger of explosion even on mixing with the ambient air.

The time necessary to do this is governed substantially by the gas throughflow capacity and thus the refrigeration power of the low-temperature section. The low-temperature section is however only designed for its original purpose of supplying the locks with the carrier gas.

SUMMARY OF THE INVENTION

The invention therefore has as its object the provision of a method and an apparatus of the type indicated which substantially eliminates the disadvantages mentioned above; in particular, the interruptions in running production when trouble occurs in the production plant are to be kept as short as possible by rapidly reducing the solvent concentration within the plant.

The invention therefore proposes in a method for avoiding or reducing trouble-induced time delays in the solvent recovery from production processes the improvement wherein apart from the solvent circuit and apart from the supplying of the locks with carrier gas, when required via at least one separate supply conduit a metered amount of pure carrier gas is supplied to the production plant and at the same time via at least one separate discharge conduit a substantially corresponding mixture amount of carrier gas and solvent is withdrawn.

The invention also proposes an apparatus for avoiding or reducing trouble-induced time delays in the operation of a plant for recovering the solvent from a mixture of carrier gas and solvent arising in a production plant, comprising a circuit for separating the solvent from the carrier gas and returning said carrier gas to the production plant, at least one further circuit for supplying the locks which has at least one low-temperature section operated with the liquid carrier gas as refrigerant and at least one supply container for the liquid carrier gas, a further supply conduit for supplying pure carrier gas in metered amount to the production plant and a further discharge conduit for removing a substantially identical metered amount of mixture of carrier gas and solvent from the production plant.

Expedient further developments are defined by the features of the subsidiary claims.

The basic idea of the invention is to employ a solvent recovery apparatus both in normal operation of a production plant for recovering solvent from the carrier gas/solvent mixture and to reduce the solvent content of the mixture very rapidly to the extent that the purified carrier gas can also be released to the environment in the event of operational trouble in said production plant.

By the introduction of a further circuit having a conduit for the supply of pure carrier gas to the production plant and a conduit for removing carrier gas/solvent mixture from the production plant, the purifying capacity of a solvent recovery apparatus can be extended without having to design the circuit for the supply of the locks with pure carrier gas or the circuit for the return of the purified carrier gas to the production plant for the event of trouble. Otherwise, the components thereof would have to be overdimensioned compared with normal operation because the desired rapid reduction of the solvent content in the event of trouble requires higher gas throughflow rates.

The integration of this circuit into the solvent recovery apparatus increases safety in the event of trouble because even with the rapid lowering of the solvent content the pressure conditions in the production plant can still be controlled in such a manner and adapted to the pressure within the locks that the barrier action is retained.

The supply of the pure carrier gas preferably takes place in the vicinity of the locks in order to further improve the barrier effect thereof.

The purifying capacity of the solvent recovery apparatus is increased according to the invention by a further low-temperature section in which the mixture of carrier gas and solvent withdrawn from the plant is freed from said solvent.

Advantageously, the liquid nitrogen which after passing through a heat exchanger is conducted in gaseous form to the production plant is employed for the cooling of the low-temperature section.

To keep the response time of the circuit as short as possible, in a particularly expedient embodiment of the invention the second newly introduced low-temperature section is held continuously at working temperature, advantageously in that it is accommodated insulated against heat with the first low-temperature section in a common housing.

By incorporating a threshold value pickup for oxygen, the invention is additionally advantageously employed for monitoring the oxygen content of the atmosphere within the production plant. To avoid any risk of explosion, the oxygen content in the atmosphere of the production plant must be kept permanently beneath a specific level, for example 5 vol %. By ensuring that the additional circuit starts operating before this value is reached, for example at 4% oxygen content, a costly interruption of the production of the manufacturing plant is avoided.

Since the purification of the carrier gas/solvent mixture during normal, i.e. trouble-free, operation of the production plant is effected completely by the carrier gas circuit and the low-temperature section of the solvent recovery apparatus, the additional circuit remains in operation only until the plant can be opened without risk or the oxygen content has been reduced to the admissible level.

BRIEF DESCRIPTION OF THE DRAWINGS

A particular expedient embodiment of the invention will be described hereinafter with the aid of the drawings, from which further features and advantages of the invention will be apparent. In the drawings.

DESCRIPTION OF THE PREFERRED EMBODIMENT

Figure 1:
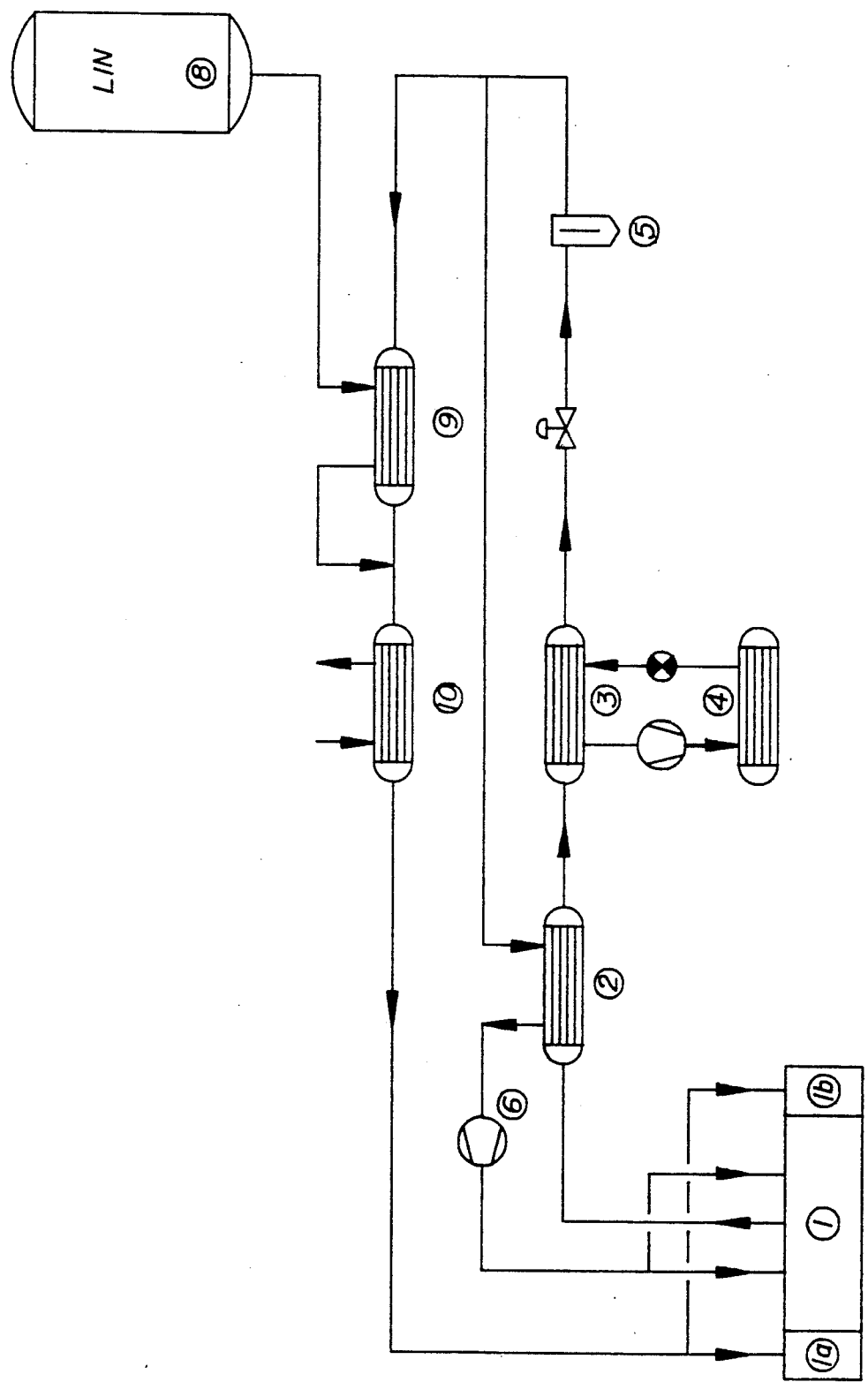
FIG. 1 is a schematic diagram of a solvent recovery apparatus.

The basic construction of a solvent recovery apparatus for removal from or supplying of a drier 1 is apparent in FIG. 1. The drier 1 illustrated therein is charged continuously or batchwise with the articles to be dried, for example video and audio tapes, and at its inlet and its outlet comprises locks 1a, 1b which are supplied with nitrogen and therefore form a protective curtain between the solvent atmosphere in the interior of the drier 1 and the ambient air.

The solvent-charged nitrogen accruing in the drier 1 is supplied to a heat exchanger 2 of the solvent recovery apparatus, where said mixture is precooled. High-boiling components are condensed in the heat exchanger 2 in accordance with the vapour pressure curve. However, the main purpose of the heat exchanger 2 is to preheat the purified carrier gas before it is conducted into the production plant by causing said gas to enter heat exchange with the withdrawn carrier/solvent mixture.

The precooled solvent/nitrogen mixture freed from high-boiling components passes from the heat exchanger 2 into a solvent condenser 3 in which the main component of the solvent is condensed against outside cold. The outside cold is furnished by the evaporator 3 of a refrigerating machine with refrigerant condenser 4.

From the evaporator 3 the two-phase mixture of liquid solvent/gaseous nitrogen passes to a solvent separator 5 where the solvent is separated from the nitrogen; the prepurified nitrogen flows from the separator 5 back into the heat exchanger 2 and is heated there in heat exchange with the solvent/nitrogen mixture withdrawn from the drier 1. A fan 6 extracts the nitrogen from the heat exchanger 2 and returns it to the drier 1.

The recovered solvent collected in the separator 5 is intermediately stored in a container and as a rule pumped back by a pump to the tank store for the solvent (not illustrated).

To prevent any oxygen penetrating into the drier 1 and the solvent being able to leave the drier 1, the locks 1a, 1b of the drier are supplied with nitrogen to generate a positive flow in both directions, outwardly to the front of the locks and inwardly into the drier.

To ensure a positive flow from the locks 1a, 1b into the drier 1 the flushing nitrogen necessary for this purpose is continuously withdrawn from the nitrogen circuit behind the separator 5; however, in accordance with the vapour pressure curve the withdrawn nitrogen still contains a quantity of solvent such that said gas mixture must not be released to the environment. For this reason, said gas mixture is strongly cooled in a low-temperature section 9 and thus freed from solvent to such an extent that the solvent content of the gas mixture lies beneath the values prescribed by law. The coldness necessary for this purpose is made available by the liquid nitrogen which is taken from the tank 8.

The nitrogen taken from the tank 8 and now vaporized is supplied together with the purified withdrawn nitrogen after heating in a further heat exchanger 10 to the locks 1a, 1b.

Figure 2:
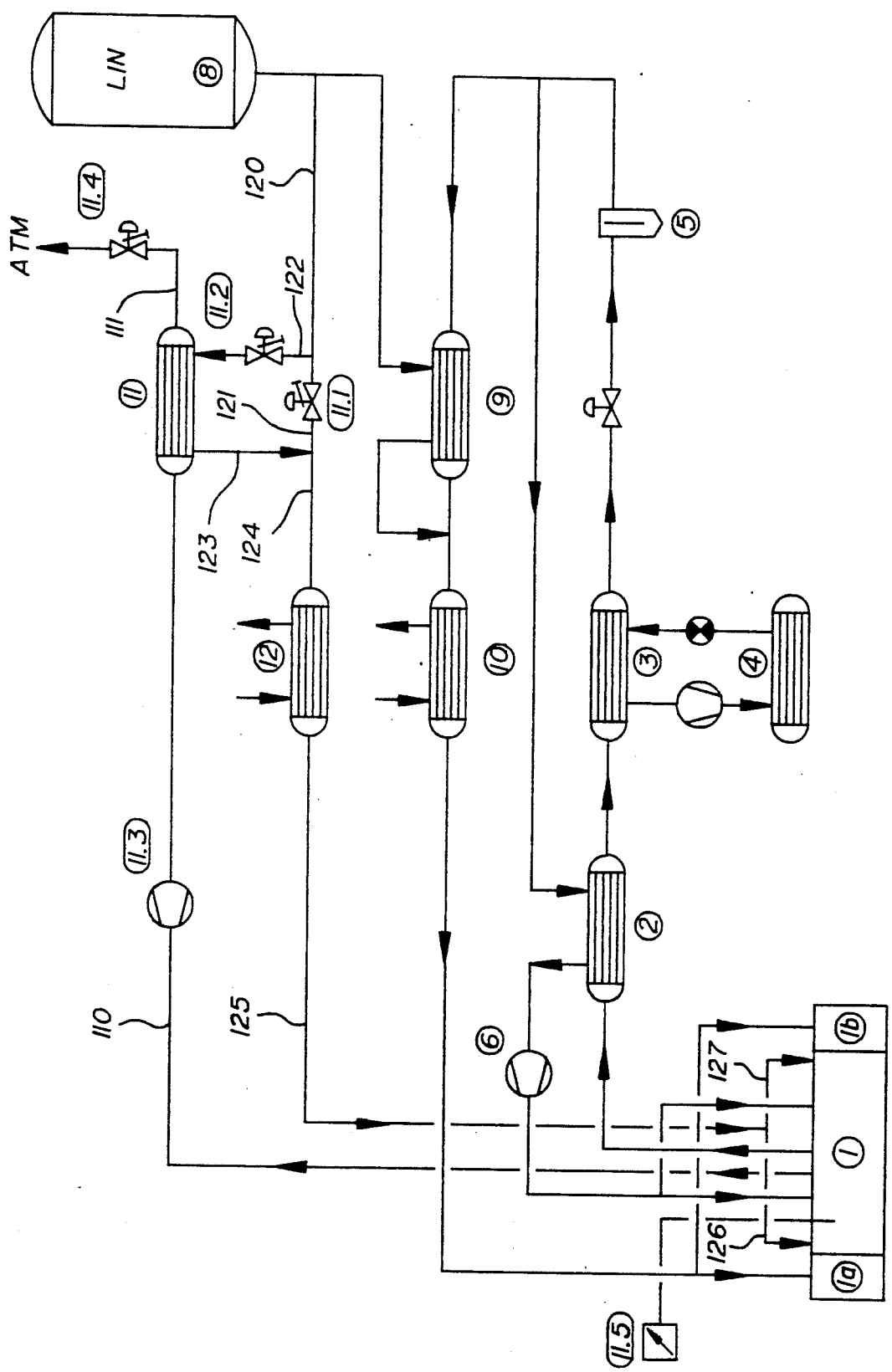
FIG. 2 shows the solvent recovery apparatus of FIG. 1 with an additional circuit for the supply of pure carrier gas or withdrawal of the mixture from the production plant.

When trouble occurs within the production plant 1, in a first operating phase liquid nitrogen in metered amount is supplied from the supply container 8 of the solvent recovery apparatus to a heat exchanger 12 through an additional circuit illustrated in FIG. 2 via conduits 120, 121 and 124. The nitrogen is vaporized and introduced into the production plant 1 in the vicinity of the locks 1a, 1b via conduits 125, 126 and 127.

At the same time, substantially the same amount of nitrogen/solvent mixture is extracted from the drier via a conduit 110 by means of a fan 11.3 and supplied to a low-temperature section kept permanently substantially at the temperature level of liquid nitrogen. The solvent is condensed out, separated and supplied to a solvent tank. The purified nitrogen is released to the environment via a conduit 111 and a metering valve 11.4.

The finely metered supply of the pure nitrogen or the withdrawal of the mixture is of particular significance when starting up the additional circuit because the pressure conditions within the production plant 1 must not be appreciably altered, since otherwise either solvent blows out of the locks or oxygen-rich air could penetrate into the locks and then into the plant 1. The additional circuit must therefore cooperate particularly closely with the other circuits of the solvent recovery apparatus.

The metering valve 11.2 is successively opened in the supply conduit 122 in order to supply to the low-temperature section 11 the amount of liquid nitrogen necessary to maintain the low temperature. The flow via the conduit 121 is correspondingly closed by the metering valve 11.1, i.e. the nitrogen is now already preheated when entering the heat exchanger 12, this additionally enabling the energy necessary to vaporize the nitrogen to be reduced. When the solvent content in the production plant 1 has been reduced to the admissible value, the additional circuit is switched off again.

To further increase the operational continuity of the production plant 1, the additional circuit is also employed when the oxygen content in the atmosphere of the production plant 1 rises above a set threshold value. For this purpose, a threshold value pickup 11.5 is introduced into the circuit and continuously measures the oxygen content in the drier 1, switching the additional circuit on when the value set is exceeded and off again when the value drops below the threshold.

We claim:

1. A method for reducing trouble-induced time delays in solvent recovery from the atmosphere of a production plant having locks, comprising the steps of:
   a) withdrawing a solvent-charged carrier gas from the production plant;
   b) separating and recovering solvent from the withdrawn gas to attain a partially purified, withdrawn gas;
   c) supplying at least a part of the partially purified, withdrawn gas to the production plant;
   d) supplying carrier gas to the locks of the production plant; and
   e) additionally supplying when required a metered amount of pure carrier gas to the production plant via at least one separate supply conduit and withdrawing at the same time a substantially identical metered amount of solvent-charged carrier gas from the production plant via at least one separate discharge conduit.

2. A method according to claim 1, wherein the solvent-charged carrier gas withdrawn from the production plant via the discharge conduit is freed from the solvent in a low-temperature section.

3. A method according to claim 2, wherein the low-temperature section is operated with liquid carrier gas as a refrigerant, which is supplied to the production plant via the further supply conduit.

4. A method according to claim 3, wherein the liquid carrier gas is withdrawn directly from a supply container.

5. A method according to claim 4, wherein said supply container also serves as supply container of the circuit for supplying the locks with pure carrier gas.

6. A method according to claim 1, wherein liquid carrier gas is heated in a heat exchanger and supplied to the production plant in gaseous form via the supply conduit.

7. A method according to claim 1, wherein the supply of the pure carrier gas to the production plant takes place in the vicinity of the locks.

8. A method according to claim 2, wherein the solvent-charged carrier gas withdrawn from the production plant is released to the environment after purification in the low-temperature section.

9. A method according to claim 2, wherein the low-temperature section is held continuously at its operating temperature during the operation of the production plant.

10. A method according to claim 9, wherein the heat insulation of the low-temperature section and a further low-temperature section of the circuit for supplying the locks is effected in a common housing.

11. A method according to claim 1, wherein in conjunction with a threshold value pickup for the oxygen content of the production plant the oxygen content of the latter is kept at a safe distance from the highest permissible value.

12. An apparatus for reducing trouble-induced time delays in solvent recovery from the atmosphere of a production plant, comprising:
   a) a conduit for removing solvent-charged carrier gas from the production plant;
   b) a solvent condenser where removed solvent is condensed;
   c) a solvent separator where condensed solvent is separated and recovered to attain a partially purified, removed gas;
   d) a conduit for supplying the partially purified, removed gas to the production plant;
   e) a low-temperature section which is operated with liquid carrier gas from a supply container as a refrigerant and where a part of the partially purified, removed gas is freed from residual solvent;
   f) a conduit for supplying the gas further purified in the low-temperature section to the locks of the production plant;
   g) a further supply conduit for separately supplying a metered amount of pure gas to the production plant; and
   h) a further discharge conduit for removing a substantially identical metered amount of solvent-charged carrier gas from the production plant.

13. An apparatus according to claim 12 wherein for purifying the solvent-charged carrier gas removed from the production plant, a further low-temperature section is provided which for insulation against heat is accommodated with the low-temperature section of the circuit for supplying the locks in a common housing.

14. An apparatus according to claim 12, wherein the further conduit is in communication with a supply container for the liquid carrier gas.

15. An apparatus according to claim 12, wherein for preheating the pure gas to be supplied to the production plant via the further supply conduit a heat exchanger is provided.

* * * * *